United States Patent [19]
Ajero

[11] 3,811,550
[45] May 21, 1974

[54] APPARATUS FOR ORIENTING TAPERED ARTICLES

[75] Inventor: Fortunato S. Ajero, South Milwaukee, Wis.

[73] Assignee: Hughes Co., Inc., Columbus, Ohio

[22] Filed: Aug. 14, 1972

[21] Appl. No.: 280,335

[52] U.S. Cl. ......................................... 198/272
[51] Int. Cl. ............................................ B65g 47/24
[58] Field of Search... 198/33 AA, 33 AD; 221/171, 221/172

[56] References Cited
UNITED STATES PATENTS

| | | | |
|---|---|---|---|
| 2,890,557 | 6/1959 | Greer | 221/171 X |
| 2,976,978 | 3/1961 | Huller | 198/33 AA |
| 3,513,959 | 5/1970 | Frehn | 198/33 R |

*Primary Examiner*—Edward A. Sroka
*Attorney, Agent, or Firm*—Theodore J. Long; John M. Winter

[57] ABSTRACT

Apparatus for orienting tapered articles, having a horizontal rotating cylinder, a conveyor for individually depositing randomly oriented tapered articles on the outer surface of the cylinder, and a moveable traction plate adjacent to the descending side of the cylinder outer surface for pinching the larger end of each tapered article against the descending cylinder surface while permitting the smaller end of the article to gravitate downwardly between the surface and the plate at a faster rate of speed than that of the descending surface to orient the article smaller-end-first as it is released downwardly from between the descending surface and the plate.

15 Claims, 3 Drawing Figures

APPARATUS FOR ORIENTING TAPERED ARTICLES

BACKGROUND OF THE INVENTION

1. Field of the Invention

This invention relates to orienting apparatus, and more particularly to apparatus for orienting tapered articles in a desired, uniform direction to facilitate further treatment and handling.

2. Description of the Prior Art

In the handling and processing of certain tapered articles, it is sometimes necessary to orient such articles such that either the large ends or the small ends of the articles are facing in a desired direction. One example of such a requirement relates to sweet corn. In the processing of sweet corn for canning or freezing purposes, the husked ears must be fed into a cutter which removes the individual kernels of corn from the ear or cob, with the smaller tassle or tip ends of the ears entering the cutter first.

In the past it has been necessary for processing plants to employ a person to tend the conveyor feeding each corn cutter for the purpose of orienting the corn ears smaller-end-first as they proceed along the conveyor into the cutter. The industry has been acutely aware of the expense involved in orienting the corn ears by hand, and some attempts have been made to mechanize the orienting operation. However, no one has developed a simple, compact, reliable machine which can be marketed at a sufficiently low cost to provide the industry with a practical alternative to manual orientation. Accordingly, corn processing plants continue to require vast amounts of manual labor in connection with the feeding of such cutters, with the resulting costs ultimately being borne by the consumer.

SUMMARY OF THE INVENTION

Basically, my invention comprises an apparatus for continuously receiving randomly oriented tapered articles having a larger end and a smaller end, and orienting such articles so that they leave the apparatus smaller-end-first. My apparatus employs a horizontal, rotating cylinder and a conveyor for individually depositing randomly oriented tapered articles on the outer surface of the cylinder. A moveable traction plate is located adjacent to the descending side of the cylinder surface in spaced relation. In its normal or rest position, the traction plate is spaced from the rotating surface a distance less than the thickness of the larger ends of the articles.

When the tapered articles are deposited on the descending side of the cylinder surface, they are carried downwardly on the surface into contact with the traction plate. As the article continues downwardly on the descending surface, the plate is forced away from the cylinder by the tapered article.

As the plate is being forced away from the cylinder due to the action of the cylinder surface on the tapered article, the plate, in turn, exerts a resistive force upon the article. As a result, the larger end of the article is held or "pinched" between the plate and the cylinder. At the same time, the smaller end of the tapered article is free to gravitate downwardly at a greater rate of speed than that of the cylinder surface so that the article will be oriented smaller-end-first when the larger end of the tapered article is carried past the position of the traction plate and the article is released downwardly from between the cylinder surface and the traction plate. A tapered discharge hopper preferably receives the articles released from between the cylinder and traction plate and discharges the articles from the apparatus smaller-end-first.

DETAILED DESCRIPTION OF THE PREFERRED EMBODIMENT

Figure 1:
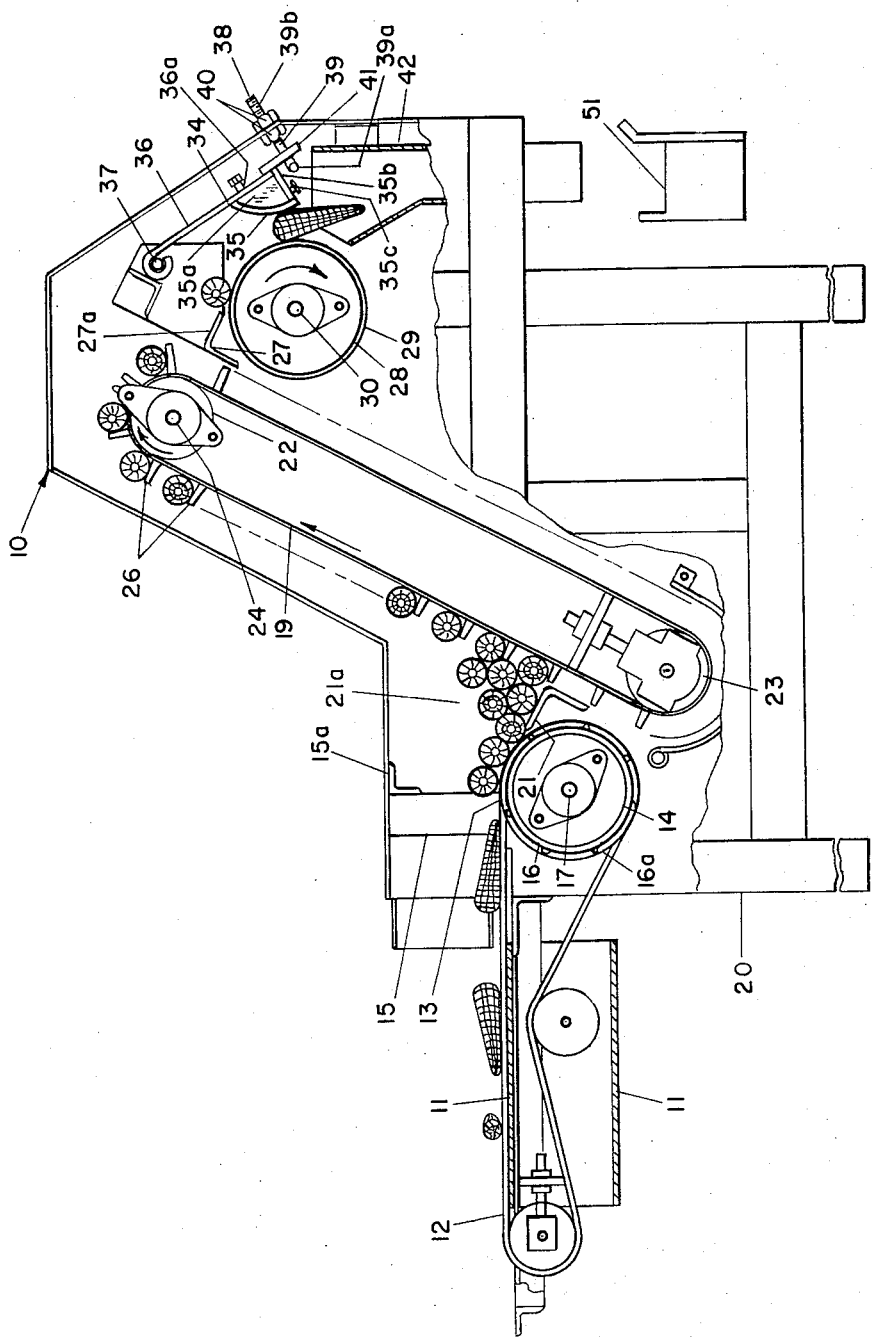
FIG. 1 is a partially schematic side view of a preferred embodiment of my invention with portions of the frame and housing cut away to reveal working parts.
Figure 2:
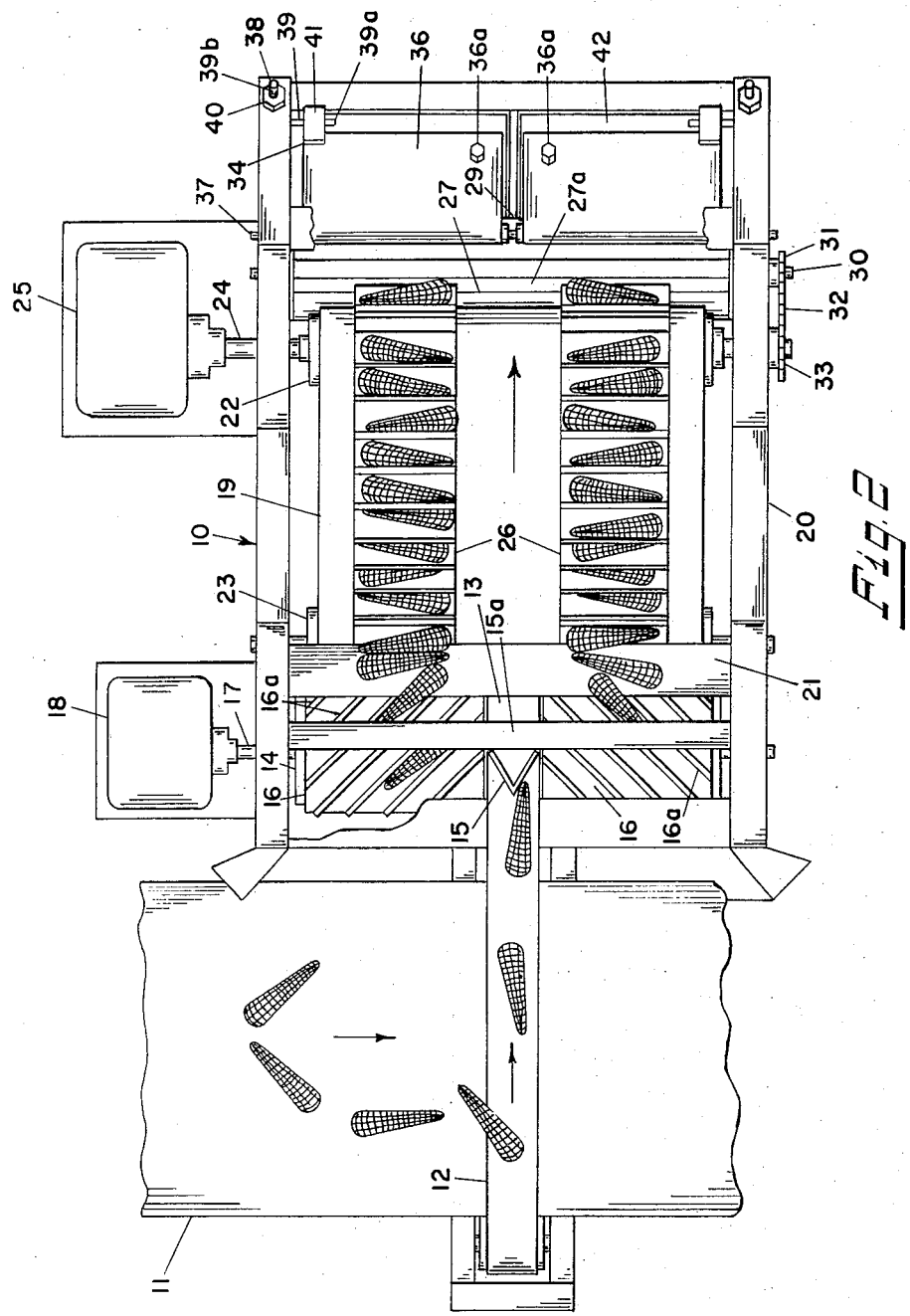
FIG. 2 is a top plan view of the apparatus of FIG. 1.
Figure 3:
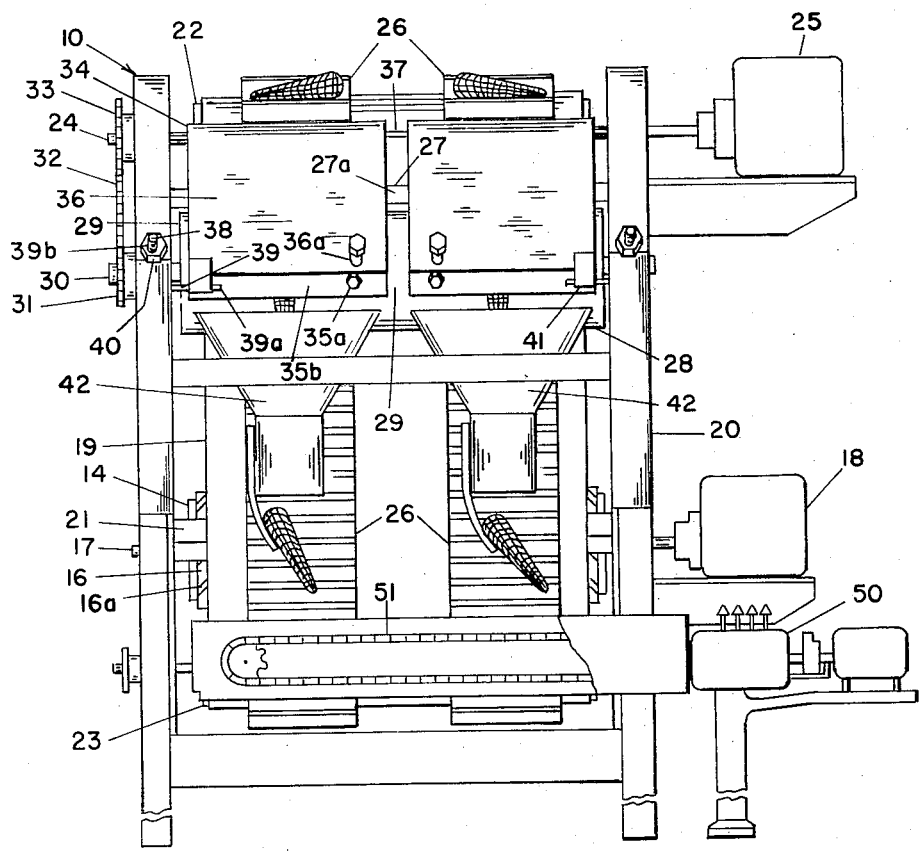
FIG. 3 is an end view of the apparatus of FIG. 1.

Referring now more particularly to the drawings, wherein like numerals refer to like parts throughout the several views, a preferred embodiment of my orienting apparatus 10 is partially schematically illustrated in FIGS. 1–3. The illustrated orienting apparatus 10 is shown orienting sweet corn ears and discharging the oriented ears smaller-end-first into a conventional corn cutter, shown schematically at reference number 50. It should be understood that my orienting apparatus 10 may be used with products other than corn which are tapered from a larger end to a smaller end.

As best shown in FIGS. 1 and 2, a supply conveyor belt 11 delivers randomly oriented ears of corn to the position of the transverse intake belt 12. The intake belt 12 is a relatively narrow flat belt which runs transversely across the upper run of the supply belt 11 to drag or convey corn ears off the supply belt in a known manner. As a continuous quantity of corn is conveyed past the location of the intake belt 12 by the supply belt 11, the intake belt will continue to take corn off the supply belt until corn backs up from the discharge end 13 of the intake belt to prevent removal of any more corn from the supply belt 11. The ears of corn on the supply belt will then continue on past the location of the intake 12 to additional intake belt positions located downstream on the supply belt 11 in a well known manner.

At the discharge end 13 of the upper run of intake belt 12, the intake belt is driven by feed roll 14 which in turn is driven by feed shaft 17 and feed gear motor 18. A V-shaped diverter 15 depending from cross frame member 15a extends vertically above the discharge end 13 of the intake belt 12 to plow or divert the incoming corn ears to either side of the intake belt 12 onto the feed roll 14. The portions of the feed roll 14 extending from either side of the intake belt 12 are covered with lagging 16 having spiral lags or beads 16a to induce the corn ears to travel transversely away from the intake belt 12 after separation by the diverter 15. The feed roll 14 delivers the ears onto an upwardly extending elevator belt 19, which co-acts with the feed roll 14 to form a hopper 21a for collecting and feeding the elevator belt 19, as best shown in FIG. 1. An inclined hopper floor 21 preferably extends between the feed roll 14 and the elevator belt 19 to facilitate delivery of the ears to the belt 19.

The elevator belt 19 is carried on an upper pulley 22 and a lower pulley 23 which are substantially equal in width to the feed roll 14. The upper pulley 22 is mounted on a drive shaft 24, which is driven by the drive gear motor 25. The drive shaft 24 and other shafts and elements of the apparatus 10 are supported by a frame 20 suitably designed to support the elements of the apparatus in their described positions. The elevator belt 19 is substantially equal in width to the pulleys 22 and 23 and carries two parallel, longitudinally extending rows of raised cleats 26. The cleats 26 each extend transversely on the elevator belt 19 for a length approximately equal to the average length of the corn ears to be oriented, and are spaced apart in each row a distance which will permit only a single ear of corn to be carried between each two successive cleats. Accordingly, the corn ears held in the hopper 21a are individually removed from the hopper 21a and conveyed upwardly on the elevator belt 19 in two parallel paths by the parallel rows of cleats 26 as best shown in FIG. 2.

As the individual ears of corn reach the top of the upper run of the elevator belt 19, the cleats 26 carrying the ears will extend radially from the upper pulley. As each cleat 26 travels around the pulley 22 to begin its downward run, the angle of the cleat will constantly change until the cleat is extending downward with respect to the horizontal, at which point the ear of corn behind the downwardly extending cleat will roll off the belt 19 and cleat 26 onto the orienting cylinder 28. A ramp member 27 preferably extends between the ends of the descending cleats 26 and a position over center of the orienting cylinder 28. The inclined upper surface 27a of the ramp member 27 thus provides an inclined ramp across which the ear can roll onto the descending side of the orienting cylinder outer surface 29.

The orienting cylinder 28 is supported horizontally by a shaft 30. Driven sprocket 31 carried by the shaft 30 is driven by a link belt 32 from the drive sprocket 33 mounted on the pulley drive shaft 24. The ratio of the sprockets 32 and 33 is preferably such that the lineal speed of the cylinder outer surface 29 is two times that of the elevator belt 19, to achieve the desired ear separation on the cylinder 28. The orienting cylinder 28 is of sufficient width to receive the corn ears delivered by both rows of cleats 26 on elevator belt 19.

The direction of rotation of the orienting cylinder 28 is the same as that of the upper pulley 22, or clockwise as viewed in FIG. 1, and indicated by the directional arrow. When a tapered corn ear is deposited on the descending side of the cylinder outer surface 29 near the top of the cylinder, the ear will be carried downward by the descending surface 29 and gravity until it reaches the traction assembly 34.

My preferred traction assembly 34 includes an arcuate traction plate 35 supported by a traction arm 36 which is pivotally mounted on pivot shaft 37 positioned above the orienting cylinder 28. The position of the pivot shaft 37 above the cylinder provides a gravity bias which urges the pivoted traction arm 36 and traction plate 35 in the direction of the cylinder 28. An adjustable spacing lug assembly 38 including a lug 39 having a transverse end 39a and a threaded end 39b and adjustment nuts 40 is adjustably mounted on the apparatus so that the lug transverse end 39a engages a stop tab 41 on the traction arm 36 to limit the downward swing of the traction arm 36 and plate 35 toward the cylinder 28. The nuts 40 may be adjusted to provide the desired spacing between the cylinder and the traction plate when the plate is in its normal or rest position. The axis of curvature of the traction plate 35 is parallel to the horizontal axis of the cylinder 28, and the traction plate is normally spaced from the cylinder 28 a uniform distance less than the thickness of the larger ends of the tapered ears and greater than the thickness of the smaller ends of the ears.

When the corn ear deposited on the cylinder outer surface 29 reaches the position of the traction plate 35 the larger end of the ear is momentarily engaged or "pinched" between the descending cylinder surface 29 and the traction plate 35. The cylinder outer surface 29 is preferably formed by a covering or lagging of rough top rubber or plastic belting to provide a resilient, slightly roughened friction surface, so that the larger end of the ear will be carried downward by the descending outer surface 29 while so engaged or pinched between the surface 29 and the traction plate 35, without damage to the exposed corn kernels.

As the larger end of the ear is carried downward by the descending outer surface 29, the traction plate is forced outwardly against its gravity bias by the engaged ear until the spacing between the cylinder surface 29 and the traction plate equals the maximum thickness of the larger end of the ear. At the same time the smaller end of the ear is free to gravitate downwardly through the space between the descending surface 29 and the traction plate 35 so that the smaller end of the ear is extending downwardly before the larger end of the ear is released from between the opposed descending surface and plate as shown in FIG. 1. The lineal speed of the descending cylinder outer surface 29 must be less than the speed at which the smaller end of the ear will gravitate downwardly to insure that the ear will be oriented smaller-end-first before the larger end of the ear is released from between the cylinder outer surface 29 and the traction plate 35. Release of the larger end of the ear will occur when the larger end has been carried past the position of the traction plate 35 by the descending surface 29. The traction plate 35 will then be returned to its normal spaced position by gravity to await the arrival of the next ear to be oriented.

The radius of curvature of the arcuate traction plate 35 is preferably approximately equal to that of the cylinder outer surface 29 to equalize the squeeze or "pinch factor" on the engaged or "pinched" ear. The amount of pressure on the engaged ear depends upon the weight of the traction assembly 34 and the position of the pivot shaft 37. The heavier the pivotally mounted traction assembly 34 or the farther the pivot shaft 37 is positioned toward the left as viewed in FIG. 1, the greater the force or "pinch factor" exerted by the traction plate 35 on the ear. Preferably, my arcuate traction plate 35 is attached to arm 36 with end panels 35a and bottom panel 35b to form a closed receptacle having a filler pipe 36a and a drain outlet 35c. The receptacle may be filled with a calibrated amount of liquid, such as corn oil, to provide the pivoted traction assembly with the desired weight to exert the minimum force necessary to engage the larger ends of the corn ears against the descending surface 29 so that the speed of descent of the larger ends of the ears will be limited to that of the descending surface 29. Obviously, excessive force must be avoided to prevent damage to the ears or failure of the traction assembly 34 to pivot outwardly to allow passage of the ear. Generally, the required "pinch factor" will depend on the weights and sizes of the tapered articles to be oriented, and the coefficient of friction of the pinching surfaces under operating conditions.

A tapered chute 42 is preferably positioned below the area of discharge of the corn ears from between the pinching surfaces. The chute 42 channels or funnels the corn ears downwardly to a final discharge point while maintaining their smaller-end-first orientation. Any desired receiving means may be positioned beneath the chute 42 for receiving the oriented corn ears. The drawings show the chute 42 discharging the corn ears onto the intake conveyor 51 of a conventional corn cutter 50 which removes the kernels of corn from the cobs. As the corn ear falls from the chute 42 toward the conveyor 51 smaller-end-first, the cutter conveyor 51 snatches the smaller end of the ear toward the cutter ahead of the trailing larger end of the ear, so that the ears retain their smaller-end-first orientation as they enter the cutter.

The lineal speed of the orienting cylinder outer surface 29 is of necessity less than the speed at which the smaller ends of the tapered articles being oriented will gravitate downwardly while the larger ends are engaged between the cylinder surface 29 and the traction plate 35. Accordingly, the orienting speed of a single traction assembly is limited. The illustrated embodiment of my invention employs two traction assemblies 34 in side-by-side relation, each of which co-operates with the single orienting cylinder 28 to orient corn ears individually and successively deposited on the cylinder by one of the rows of elevator belt cleats 26 at the rate of 60 per minute, or one per second. Thus, the two traction assemblies together easily have the capability to feed a single corn cutter at maximum capacity. Of course, if a different feed rate were desired for any reason, my preferred embodiment could be modified to provide only a single line feed with one traction assembly, or a multiple line feed with more than two traction assemblies.

Although I have described my invention in detail with reference to a preferred embodiment designed specifically for orienting corn ears, it should be understood that my invention may be utilized to orient any tapered article having a larger end and a smaller end and a center of gravity located between the section of maximum thickness of the article and the smaller end. While my preferred embodiment employs a cylinder 28 to define and present the descending surface 29 against which the tapered article is pinched to permit gravity orientation of the article, a moving belt or other equivalent means may be employed to provide the required descending surface. Similarly, while I have shown a pivoted gravity biased traction assembly, a spring biased movable plate or other equivalent means may be employed to provide the disclosed "pinching" action in cooperation with the descending surface.

It is understood that my invention is not limited to the particular construction and arrangement of parts herein illustrated and described, but embraces all such modified forms thereof which come within the scope of the following claims.

I claim:

1. Apparatus for orienting tapered articles having a larger end and a smaller end, comprising:
   a. a rotatable cylinder having a substantially horizontal axis of rotation, and
   b. traction means disposed in spaced relation to the descending side of the outer surface of said cylinder for pinching the larger end of each randomly oriented tapered article individually deposited on said cylinder against said descending outer surface while permitting the smaller end of said article to gravitate downwardly prior to downward release of said article smaller-end-first from between said outer surface and said traction means.

2. The apparatus described in claim 1 including discharge means for receiving the tapered articles released from between the cylinder and traction means and discharging said articles from said apparatus smaller-end-first.

3. The apparatus described in claim 1 wherein the traction means comprises a traction member disposed parallel to said cylinder outer surface and biased toward said outer surface, said traction member being movable in response to contact by a tapered article to increase the space between said traction member and said outer surface to the maximum width of said tapered article.

4. The apparatus described in claim 1 wherein the traction means comprises a traction assembly having a traction plate extending parallel to the cylinder outer surface and being biased toward a rest position wherein said traction plate is spaced from said surface a distance normally less than the minimum thickness of the larger ends of the tapered articles, said traction assembly being pivotable as the larger end of each tapered article contacted by said traction plate is carried downwardly by said descending outer surface between said outer surface and said traction plate, said traction assembly returning to said rest position after the larger end of each said tapered article has been released from between said outer surface and said traction plate.

5. The apparatus described in claim 4 wherein the traction plate has a convex surface for contacting the tapered articles.

6. The apparatus described in claim 4 wherein the pivotable traction assembly is gravity biased, and wherein said traction assembly includes weight adjustment means for increasing and decreasing the force with which the traction plate engages the tapered article against the descending cylinder outer surface.

7. The apparatus described in claim 1 including conveyor means for individually depositing randomly oriented tapered articles on the cylinder outer surface.

8. The apparatus described in claim 7 wherein a plurality of traction means are disposed in spaced relation to the descending side of said cylinder outer surface in side-by-side position, and wherein the conveyor means individually conveys tapered articles onto said cylinder outer surface in longitudinal alignment with each said traction means.

9. The apparatus described in claim 8 including discharge means for receiving the tapered articles released from between the cylinder and each traction means and discharging said articles from said apparatus smaller-end-first.

10. The apparatus described in claim 9 wherein the discharge means comprises a tapered chute positioned beneath the area of discharge of the tapered articles from between the cylinder outer surface and each traction means, said chute having an area of restricted width to maintain the smaller-end-first orientation of said tapered articles as they are discharged from said apparatus through said chute.

11. The apparatus described in claim 1 wherein the outer surface of the cylinder is formed by friction means for engaging and carrying the larger ends of the tapered articles downward past the traction means at the speed of said outer surface without damage to said tapered articles.

12. Apparatus for orienting tapered articles having a larger end and a smaller end, comprising:
   a. a descending moving surface,
   b. means for individually delivering randomly oriented tapered articles into contact with said moving surface, and
   c. traction means disposed in spaced relation to said moving surface for pinching the larger end of each said tapered article against said moving surface while permitting the smaller end of said article to gravitate downwardly at a greater rate of speed than that of the moving surface whereby the article will be oriented smaller-end-first when the larger end is released downwardly from between the moving surface and the traction means.

13. Apparatus for orienting tapered articles having a larger end and a smaller end, comprising:
   a. a descending moving surface for receiving randomly oriented tapered articles,
   b. a movable traction plate biased toward said moving surface to a rest position wherein said traction plate is spaced from said surface a distance less than the thickness of the larger ends of said articles, and
   c. said traction plate being movable away from said outer surface as the larger end of each tapered article is carried downwardly between said surface and said plate by said descending moving surface, said plate bias causing the larger end of said tapered article to be pinched against said moving surface by said plate while the smaller end of said article is free to gravitate downwardly at a greater rate of speed than that of said moving surface whereby the article will be oriented smaller-end-first when the larger end of said article is released from between said moving surface and said traction plate.

14. Apparatus for orienting tapered articles having a larger end and a smaller end, comprising:
   a. a descending moving surface,
   b. traction means disposed in spaced relation to said moving surface for pinching the larger end of each tapered article individually deposited on said moving surface against said surface while permitting the smaller end of said article to gravitate downwardly through the space between said moving surface and said traction means at a greater rate of speed than that of the moving surface to orient the article smaller-end-first prior to release of said article downwardly from between said moving surface and said traction means.

15. Apparatus for orienting tapered articles having a larger end and a smaller end, comprising:
   a. an intake belt for receiving randomly oriented tapered articles,
   b. a cylindrical feed roll engaging and driving said intake belt, said feed roll having lagging means adjacent said intake belt for urging tapered articles transversely away from the intake belt,
   c. an inclined elevator conveyor having a lower pulley located below said feed roll, an upper pulley located above said feed roll, and an endless belt extending around and driven by said pulleys, said elevator conveyor co-acting with said feed roll to form a hopper for receiving and feeding tapered articles,
   d. a plurality of raised cleats carried by said elevator belt in at least one longitudinal row, said cleats extending transversely of said belt and being longitudinally spaced in said row to permit only a single tapered article to be received and conveyed between longitudinally adjacent cleats and to individually discharge each said tapered article as the portion of the elevator belt supporting said article passes over said upper pulley,
   e. a descending moving surface positioned below said upper pulley to receive tapered articles individually discharged from said elevator belt,
   f. traction means disposed in spaced relation to said moving surface for pinching the larger end of each said tapered article against said moving surface while permitting the smaller end of said article to gravitate downwardly at a greater rate of speed than that of the moving surface whereby the article will be oriented smaller-end-first when the larger end is released downwardly from between the moving surface and the traction means.

* * * * *

UNITED STATES PATENT OFFICE
CERTIFICATE OF CORRECTION

Patent No. 3,811,550          Dated May 21, 1974

Inventor(s) Ajero, Fortunato S.

It is certified that error appears in the above-identified patent and that said Letters Patent are hereby corrected as shown below:

"Assignee: Hughes Company, Inc. Columbus, Ohio" should be
--Assignee: Hughes Company, Inc. Columbus, Wisconsin--

Signed and sealed this 17th day of September 1974.

(SEAL)
Attest:

McCOY M. GIBSON JR.
Attesting Officer

C. MARSHALL DANN
Commissioner of Patents